United States Patent
Lautzenheiser et al.

(10) Patent No.: US 6,351,734 B1
(45) Date of Patent: Feb. 26, 2002

(54) SYSTEM AND METHOD FOR RESOURCE ALLOCATION AND PLANNING

(75) Inventors: Ted G. Lautzenheiser, Forest Lake; David R. Lacy, Cottage Grove, both of MN (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/150,466

(22) Filed: Sep. 9, 1998

(51) Int. Cl.⁷ ............................................. G06F 17/60
(52) U.S. Cl. ........................................ 705/8; 364/468
(58) Field of Search ................................. 705/8, 7, 9

(56) References Cited

U.S. PATENT DOCUMENTS

| | | | | |
|---|---|---|---|---|
| 4,744,028 A | * | 5/1988 | Karmarkar ...................... | 705/8 |
| 5,343,388 A | * | 8/1994 | Wedelin ......................... | 705/8 |
| 5,630,070 A | * | 5/1997 | Dietrich et al. ................ | 705/8 |
| 5,765,143 A | * | 6/1998 | Sheldon et al. ............... | 705/28 |
| 5,826,236 A | * | 10/1998 | Narimatsu et al. ............. | 705/8 |
| 5,826,239 A | * | 10/1998 | Du et al. ........................ | 705/8 |
| 5,893,074 A | * | 4/1999 | Hughes et al. ................. | 705/8 |
| 5,907,490 A | * | 5/1999 | Oliver .................... | 364/468.05 |
| 5,913,200 A | * | 6/1999 | Wakiyama ..................... | 705/8 |
| 5,943,652 A | * | 8/1999 | Sisley et al. .................... | 705/9 |
| 5,946,663 A | * | 8/1999 | Tanaka et al. ................. | 705/8 |
| 5,950,170 A | * | 9/1999 | Pan et al. ....................... | 705/7 |
| 5,963,911 A | * | 10/1999 | Walker et al. .................. | 705/7 |
| 5,974,392 A | * | 10/1999 | Endo ............................. | 705/8 |
| 5,983,194 A | * | 11/1999 | Hogge et al. .................. | 705/7 |
| 6,006,192 A | * | 12/1999 | Cheng et al. .................. | 705/7 |
| 6,006,194 A | * | 12/1999 | Merel ............................. | 705/8 |
| 6,009,405 A | * | 12/1999 | Leymann et al. .............. | 705/9 |
| 6,012,037 A | * | 1/2000 | Yoshikawa ..................... | 705/8 |
| 6,016,503 A | * | 1/2000 | Overby, Jr. et al. ......... | 709/104 |
| 6,032,121 A | * | 2/2000 | Dietrich et al. ................ | 705/8 |

FOREIGN PATENT DOCUMENTS

| | | | | |
|---|---|---|---|---|
| DE | 19751273 | * | 5/1999 | ........... G06F/17/00 |
| DE | 19912221 | * | 2/2000 | ........... G05B/17/00 |

OTHER PUBLICATIONS

Crabb, Reh–*MacAs??* V9 #4 p. 87–Apr. 1993–MacRegent Pro.*

Riccinti, Mike–*Datamation* v 38 #2 p. 42 Jan. 15, 1992 "Convert Manfacting to the Gatr???".*

\* cited by examiner

*Primary Examiner*—V. Millin
*Assistant Examiner*—Geoffrey Akers
(74) *Attorney, Agent, or Firm*—Charles A. Johnson; Mark T. Starr; Crawford, PLLC

(57) ABSTRACT

A system and method for management of resources estimated to be required to develop a product and distribution of resources allocated for the development of the product. A hierarchy of projects required for completion of the product is defined in a database, estimates of resource requirements are associated with the respective projects, and project-level target allocations of resources are associated with the respective projects. The project-level target allocations of resources are automatically summed for a calculated total target allocation of resources, and the calculated total target allocation of resources is associated with the product. An actual total target allocation of resources is assigned to the product, and the hierarchy of projects, associated estimates of resource requirements, project-level target allocations, the calculated total target allocation, and the actual target allocation of resources for the product are interactively displayed.

19 Claims, 19 Drawing Sheets

CREATE PROJECT

PROJECT NAME: _____606_____

ORGANIZATION: _____

ORGANIZATIONAL PRIORITY: __4120__

ORGANIZATIONAL PRIORITY DEFINITIONS:
1-49 = FUNDED
50-89 = UNFUNDED
90-99 = UNFUNDED, TO DISCUSS
100 = DEFAULT, NOT ASSIGNED

CHILD: * UN-ASSIGNED * ▼ — 608

PROJECT MANAGER: ▼

LINE MANAGER: ▼

PROJECT OBJECTIVES:

PROJECT KEY DELIVERABLES:

PROJECT DESCRIPTION:

PROJECT INTERDEPENDENCIES:

PROJECT DATES: (ENTERING USING THE FORMAT MM/DD/YY)

TECHNICAL FEASIBILITY: _____

FCS: _____  DST: _____

FIG. 7A

TARGET & ESTIMATED EFFORT DATA:

WHEN YEARLY, QUARTERLY AND MONTHLY VALUES ARE SHOWN, YOU MAY UPDATE ANY ONE AND THE OTHERS WILL BE CALCULATED ACCORDINGLY WHEN THE DATA IS ENTERED INTO THE DATABASE. IF MULTIPLE VALUES ARE UPDATED, THE LOWEST GRANULARITY CHANGES ARE USED

| | YEAR | Q1 | Q2 | Q3 | Q4 |
|---|---|---|---|---|---|
| 1997 TARGET: | 0 | 0 | 0 | 0 | 0 |

| | YEAR | Q1 | Q2 | Q3 | Q4 |
|---|---|---|---|---|---|
| 1998 TARGET: | 0 | 0 | 0 | 0 | 0 |
| 1997 ESTIMATE: | 0 ←612 | 0 ←614 | 0 ←616 | 0 ←618 | 0 ←620 |

| | JAN | FEB | MAR | APR | MAY | JUN | JUL | AUG | SEP | OCT | NOV | DEC |
|---|---|---|---|---|---|---|---|---|---|---|---|---|
| 1998 TARGET: | 0 | 0 | 0 | 0 | 0 | 0 | 0 | 0 | 0 | 0 | 0 | 0 |
| 1998 ESTIMATE: | 0 | 0 | 0 | 0 | 0 | 0 | 0 | 0 | 0 | 0 | 0 | 0 |

TARGET EFFORT FOR YEAR.... 1999: 0  2000: 0  2001: 0 ←622
ESTIMATED EFFORT FOR YEAR.... 1999: 0  2000: 0  2001: 0 ←624

[SUBMIT]

[FORT USER HOME]

FIG. 7B

CREATE PARENT

626

ENTER THE APPROPRIATE DATA BELOW, THEN CLICK ON "SUBMIT".

A NEW PARENT CAN BE CREATED FOR TWO REASONS: 1. IN ORDER TO PROPOSE A NEW PARENT FOR DEVELOPMENT, THAT WILL LATER BE ENTERED INTO RDP AFTER IT IS APPROVED, OR 2. IN ORDER TO CREATE A NEW PARENT FOR CERTAIN CATEGORIES OF AFP DATA (LIKE OVERHEAD, CERS) THAT WILL REMAIN IN FORT BUT NEVER ACTUALLY BE IN RDP.

TO CREATE A PARENT, ENTER THE NAME, MAJOR PRIORITY, AND CATEGORY.

PARENT NAME: [    ]

MAJOR PRIORITY: [0]

CATEGORY: [DEVELOPMENT ▸]    STATE: [PROPOSED ▸]

[SUBMIT]

[FORT USER HOME]

FIG. 8

CREATE CHILD

628

ENTER THE APPROPRIATE DATA BELOW, THEN CLICK ON "SUBMIT".

A NEW CHILD CAN BE CREATED FOR TWO REASONS: 1. IN ORDER TO PROPOSE A NEW CHILD FOR DEVELOPMENT, THAT WILL LATER BE ENTERED INTO RDP AFTER IT IS APPROVED, OR 2. IN ORDER TO CREATE A CHILD FOR CERTAIN CATEGORIES OF AFP DATA (LIKE OVERHEAD, CERS) THAT WILL REMAIN IN FORT BUT NEVER ACTUALLY BE IN RDP.

TO CREATE A CHILD, ENTER THE NAME, MINOR PRIORITY, AND SELECT THE PARENT.

CHILD NAME: [          ]

MINOR PRIORITY: [ 1 ] (MUST BE GREATER THAN 0)

PARENT: [ CDL CPBI H/W SUPPORT ▼ ]

[ SUBMIT ]

[ FORT USER HOME ]

FIG. 9

ALLOCATE HEADCOUNT
632

CHOOSE THE TYPE OF HEADCOUNT ALLOCATION DESIRED, THEN CLICK ON "SELECT".

- 634 ● ALLOCATE YOUR ORGANIZATION'S TARGET HEADCOUNT TO ALL RDP CHILDREN/PARENTS (SINGLE COLUMN IN AFP SPREADSHEET)
- 636 ○ ALLOCATE YOUR ORGANIZATION'S TARGET HEADCOUNT TO THE CURRENTLY ASSIGNED RDP CHILDREN/PARENTS
- 638 ○ ALLOCATE YOUR ORGANIZATION'S TARGET HEADCOUNT TO PARENT/CHILDREN AND PROJECTS, FOR ASSIGNED PROJECTS
- 640 ○ ALLOCATE YOUR ORGANIZATION'S TARGET HEADCOUNT TO PROJECTS, ORDERED BY ORGANIZATIONAL PRIORITY

SELECT THE RANGE OF PROJECTS TO INCLUDE IN THE PROJECT CALCULATIONS:

LOWER LIMIT [1 ▼] 642     UPPER LIMIT [49 ▼] 644

[SELECT]

[FORT USER HOME]

FIG. 10

ALLOCATE ORGANIZATION: 4120 TO RDP PARENTS AND CHILDREN

652

| RDP PARENTS ©CHILDREN | ORG 4120 TOP-DOWN TARGET HEAD COUNT | ORG 4120 CALCULATED TARGET HEAD COUNT | ORG 4120 ESTIMATE (ROLL-UP) HEAD COUNT | DISCREPANCY |
|---|---|---|---|---|
| PARENT 1 | 0.0 (0.0) | 0.0 | 0.0 | |
| ©CHILD 1 | 0.0 | 0.0 | 0.0 | |
| ©CHILD 2 | 0.0 | 0.0 | 0.0 | |
| ©CHILD 3 | 0.0 | 0.0 | 0.0 | |
| ... | | | | |
| ©CHILD M | 0.0 | 0.0 | 0.0 | |
| PARENT 2 | 0.0 (0.0) | 0.0 | 0.0 | |
| ©CHILD M+1 | 0.0 | 0.0 | 0.0 | |
| ©CHILD M+2 | 0.0 | 0.0 | 0.0 | |
| ... | | | | |
| PARENT R | 39.3 (39.3) | 39.3 | 51.0 | ***** |
| ©CHILD N | 33.8 | 33.8 | 43.5 | ***** |
| ©CHILD N+1 | 5.5 | 5.5 | 7.5 | |
| ©CHILD N+2 | 0.0 | 0.0 | 0.0 | |
| ©CHILD N+3 | 0.0 | 0.0 | 0.0 | |
| ... | | | | |

ALLOCATE HEADCOUNT FOR ORGANIZATION: 4120 TO PROJECTS

THE HIERARCHY SHOWN INCLUDES ONLY THOSE PARENTS & CHILDREN WHICH HAVE PROJECTS ASSIGNED TO THEM, ALONG WITH THAT SET OF PROJECTS. UNASSIGNED PROJECTS ARE NOT SHOWN IN THIS VIEW.

| RDP PARENTS © CHILDREN ©© PROJECTS | ORG 4120 TOP-DOWN TARGET HEAD COUNT (664) | ORG 4120 CALCULATED TARGET HEAD COUNT (666) | ORG 4120 ESTIMATE (ROLL-UP) HEAD COUNT (667) | PROJECT PRIORITY | DISCREPANCY (668) |
|---|---|---|---|---|---|
| PARENT R | 39.3 | 39.3 | 51.0 | | ***** |
| © CHILD N | 33.8 (669) | 33.8 (670) | 43.5 | | ***** |
| ©© PROJECT 1 | | 1.5 | 2.0 | 5 | ***** |
| ©© PROJECT 2 | | 6.3 | 8.0 | 5 | ***** |
| ©© PROJECT 3 | | 3.0 | 3.0 | 5 | |
| ©© PROJECT 4 | | 1.0 | 2.5 | 5 | ***** |
| ©© PROJECT 5 | | 18.0 | 23.0 | 5 | ***** |
| ©© PROJECT 6 | | 2.0 | 2.5 | 5 | ***** |
| ©© PROJECT 7 | | 2.0 | 2.5 | 5 | ***** |
| © CHILD N+1 | 5.5 | 5.5 | 7.5 | | ***** |
| ©© PROJECT 8 | | 4.5 | 5.5 | 5 | ***** |
| ©© PROJECT 9 | | 1.0 | 2.0 | 5 | ***** |

FIG. 12

PLAN/BUDGET VS. ACTUAL EFFORT (CDL)
FOR PRODUCT X

702

DATE & TIME OF REPORT: 08-19-98 09:42 AM
AFP REVISION: 19
TRS DATA WAS LAST UPDATED ON: 1998-08-06 11:49:10
THE "BUDGET ON TRACK" INDICATOR WILL SHOW THE "PLAN ON TRACK" INDICATOR WILL SHOW
"OVERSPENT!" IF THE 'ACTUAL YTD'> BUDGET, "OVER!" IF THE 'ACTUAL YTD'> (PLAN YTD + 10%),
"OVER?" IF THE 'RUN RATE YTD'> (BUDGET + 10%), "UNDER!" IF THE 'ACTUAL YTD'< (PLAN YTD − 10%),
"UNDER?" IF THE 'RUN RATE YTD'< (BUDGET − 10%), "OK" IF A VALUE EXISTS IN THE PLAN YTD COLUMN,
"OK?" IF A VALUE EXISTS IN THE BUDGET COLUMN, AND THE AND THE ACTUAL YTD IS WITHIN THE ABOVE RANGES.
ACTUAL YTD IS WITHIN THE ABOVE RANGES. "*" IF NO FORT PLAN CURRENTLY EXISTS.

IF THE ABSOLUTE DIFFERENCE BETWEEN PLAN/BUDGET AND ACTUAL IS LESS THAN HEADCOUNT MINIMUM (0.5), IT WILL BE IGNORED.
ALL PLAN DATA IS BASED ON FUNDED PROJECTS, WHICH HAVE AN ORGANIZATIONAL PRIORITY OF 1...49.

| PARENT PRODUCT X | | 704 AFP ID | 706 HOURS YTD | 708 ACTUAL YTD | AFP BUDGET | 710 FORT YTD PLAN | 716 RUN RATE YTD | 718 RUN RATE EOY | 712 PLAN ON TRACK? | 714 BUDGET ON TRACK? | |
|---|---|---|---|---|---|---|---|---|---|---|---|
| | CHILD 1 | KF07 | 2051.3 | 1.1 | 0.0 | 0.0 | 1.9 | −2.8 | * | OVER SPENT! | DETAILS |
| | CHILD 2 | KF21 | 823.9 | 0.5 | 5.0 | 0.0 | 0.8 | 11.12 | * | UNDER? | DETAILS |
| | CHILD 3 | KF63 | 164.9 | 0.1 | 1.0 | 0.0 | 0.2 | 2.2 | * | UNDER? | DETAILS |
| | CHILD 4 | KF54 | 0.0 | 0.0 | 7.4 | 0.0 | 0.0 | 0.0 | * | UNDER? | DETAILS |
| | CHILD 5 | KF50 | 0.0 | 0.0 | 2.4 | 0.0 | 0.0 | 0.0 | * | UNDER? | DETAILS |
| | CHILD 6 | KF56 | 272.0 | 0.2 | 1.5 | 0.1 | 0.3 | 3.3 | OK | UNDER? | DETAILS |
| | CHILD 7 | KF49 | 0.0 | 0.0 | 11.0 | 0.0 | 0.0 | 0.0 | * | UNDER? | DETAILS |
| | CHILD 8 | KF41 | 0.0 | 0.0 | 0.0 | 0.0 | 0.0 | 0.0 | * | | DETAILS |
| | CHILD 9 | KF31 | 174.4 | 0.1 | 4.0 | 2.2 | 0.2 | 9.7 | UNDER! | UNDER? | DETAILS |
| | CHILD 10 | KF51 | 0.0 | 0.0 | 3.0 | 0.0 | 0.0 | 0.0 | * | UNDER? | DETAILS |
| | CHILD 11 | KF60 | 0.0 | 0.0 | 0.7 | 0.0 | 0.0 | 0.0 | * | UNDER? | DETAILS |

FIG. 13A

| | | | | | | | | | |
|---|---|---|---|---|---|---|---|---|---|
| CHILD 12 | KF45 | 0.0 | 0.0 | 0.0 | 0.0 | 0.0 | 0.0 | * | UNDER? |
| CHILD 13 | KF43 | 0.0 | 0.0 | 0.0 | 1.0 | 0.0 | 0.0 | * | |
| CHILD 14 | KF42 | 0.0 | 0.0 | 0.0 | 0.0 | 0.0 | 0.0 | * | |
| CHILD 15 | KF02 | 262.0 | 0.1 | 0.0 | 0.0 | 0.8 | -0.4 | OK | UNDER? |
| CHILD 16 | KF53 | 0.0 | 0.0 | 0.0 | 6.9 | 0.2 | 0.0 | * | OK? |
| CHILD 17 | KF52 | 0.0 | 0.0 | 0.0 | 0.4 | 0.0 | 0.0 | * | OK? |
| CHILD 18 | KF40 | 0.0 | 0.0 | 0.3 | 0.5 | 0.0 | 0.0 | OK | UNDER? |
| CHILD 19 | KF62 | 683.8 | 0.4 | 0.0 | 2.0 | 0.6 | 4.0 | * | UNDER? |
| CHILD 20 | KF08 | 118.4 | 0.1 | 0.0 | 0.0 | 0.1 | -0.2 | UNDER! | OVER |
| CHILD 21 | KF29 | 340.3 | 0.2 | 3.1 | 3.2 | 0.3 | 7.5 | OK | SPENT! |
| CHILD 22 | KF33 | 5055.5 | 2.8 | 2.8 | 2.0 | 4.7 | -2.0 | | |
| TOTALS | | 9,946.1 | 5.5 | 8.5 | 52.0 | 9.3 | 32.6 | | |

TOTAL NUMBER OF PARENTS: 1
TOTAL NUMBER OF CHILDREN: 22

[BACK]  [FORT USER HOME]

PLAN/BUDGET VS. ACTUAL INDICATOR (ALL ORGS)
FOR CHILD 9

DATE & TIME OF REPORT: 08-19-98 09:44 AM
AFP REVISION: 19
TRS DATA WAS LAST UPDATED ON: 1998-08-06 11:49:10
THE "BUDGET ON TRACK" INDICATOR WILL SHOW
"OVERSPENT!" IF THE 'ACTUAL YTD'> BUDGET,
"OVER?" IF THE 'RUN RATE YTD'> (BUDGET + 10%),
"UNDER?" IF THE 'RUN RATE YTD'< (BUDGET − 10%),
"OK?" IF A VALUE EXISTS IN THE BUDGET COLUMN, AND THE ACTUAL YTD IS WITHIN THE ABOVE RANGES.

THE "PLAN ON TRACK" INDICATOR WILL SHOW
"OVER!" IF THE 'ACTUAL YTD'> (PLAN YTD + 10%),
"UNDER!" IF THE 'ACTUAL YTD'< (PLAN YTD − 10%),
"OK" IF A VALUE EXISTS IN THE PLAN YTD COLUMN, AND THE ACTUAL YTD IS WITHIN THE ABOVE RANGES.
"*" IF NO FORT PLAN CURRENTLY EXISTS.

IF THE ABSOLUTE DIFFERENCE BETWEEN PLAN/BUDGET AND ACTUAL IS LESS THAN HEADCOUNT MINIMUM (0.5), IT WILL BE IGNORED.
ALL PLAN DATA IS BASED ON FUNDED PROJECTS, WHICH HAVE AN ORGANIZATIONAL PRIORITY OF 1...49.

| PARENT | CHILD | AFP ID | HOURS YTD | ACTUAL YTD | AFP BUDGET | FORT YTD PLAN | RUN RATE YTD | RUN RATE EOY | PLAN ON TRACK? | BUDGET ON TRACK? | 4100 PLAN ON TRACK? | 4100 BUDGET ON TRACK? | 4105 PLAN ON TRACK? | 4105 BUDGET ON TRACK? | 4120 PLAN ON TRACK? | 4120 BUDGET ON TRACK? | 4140 PLAN ON TRACK? | 4140 BUDGET ON TRACK? |
|---|---|---|---|---|---|---|---|---|---|---|---|---|---|---|---|---|---|---|
| | | | | | | | | | | | DETAILS | DETAILS | DETAILS | DETAILS | DETAILS | DETAILS | DETAILS | DETAILS |
| PRODUCT X | CHILD 9 | KF31 | 174.0 | 0.1 | 4.0 | 2.2 | 0.2 | 9.7 | UNDER! | UNDER? | * | | * | | | * | UNDER! | UNDER? |

[BACK]
[FORT USER HOME]

PLAN/BUDGET VS. ACTUAL EFFORT (4140)
FOR CHILD 9

DATE & TIME OF REPORT: 08-19-98 09:45 AM
AFP REVISION: 19
TRS DATA WAS LAST UPDATED ON: 1998-08-06 11:49:10
THE "BUDGET ON TRACK" INDICATOR WILL SHOW
"OVERSPENT!" IF THE 'ACTUAL YTD'> BUDGET,
"OVER?" IF THE 'RUN RATE YTD'> (BUDGET + 10%),
"UNDER?" IF THE 'RUN RATE YTD'< (BUDGET – 10%),
"OK?" IF A VALUE EXISTS IN THE BUDGET COLUMN, AND THE
ACTUAL YTD IS WITHIN THE ABOVE RANGES.

THE "PLAN ON TRACK" INDICATOR WILL SHOW
"OVER!" IF THE 'ACTUAL YTD'> (PLAN YTD + 10%),
"UNDER!" IF THE 'ACTUAL YTD'< (PLAN YTD – 10%),
"OK?" IF A VALUE EXISTS IN THE PLAN YTD COLUMN,
AND THE ACTUAL YTD IS WITHIN THE ABOVE RANGES.
"*" IF NO FORT PLAN CURRENTLY EXISTS.

IF THE ABSOLUTE DIFFERENCE BETWEEN PLAN/BUDGET AND ACTUAL IS LESS THAN HEADCOUNT MINIMUM (0.5), IT WILL BE IGNORED.
ALL PLAN DATA IS BASED ON FUNDED PROJECTS, WHICH HAVE AN ORGANIZATIONAL PRIORITY OF 1...49.

| PARENT | CHILD | AFP ID | HOURS YTD | ACTUAL YTD | AFP BUDGET | FORT YTD PLAN | RUN RATE YTD | RUN RATE EOY | PLAN ON TRACK? | BUDGET ON TRACK? | |
|---|---|---|---|---|---|---|---|---|---|---|---|
| PRODUCT X | CHILD 9 | KF31 | 174.0 | 0.1 | 4.0 | 2.2 | 0.2 | 9.7 | UNDER! | UNDER? | DETAILS |
| TOTALS | | | 174.0 | 0.1 | 4.0 | 2.2 | 0.2 | 9.7 | | | |

TOTAL NUMBER OF PARENTS: 1
TOTAL NUMBER OF CHILDREN: 1

[BACK]
[FORT USER HOME]

FIG. 15

PLAN/BUDGET VS. ACTUAL PROJECT DATA (4140) FOR CHILD 9

THIS INCLUDES PROJECT DETAILED INFORMATION (FORT PLAN, BUDGET, ACTUALS) FOR ANY PROJECTS THAT ROLL-UP TO THE SELECTED CHILD, FOR THE SPECIFIED ORGANIZATION.

752

FORT PROJECTS FOR CHILD 9

| PROJECT NAME | PROJECT MANAGER | PROJECT PRIORITY | TARGET EFFORT YTD | SELECT |
|---|---|---|---|---|
| PROJECT Z | | 43 | 2.17 | VIEW |

754 — 758

TRS PROJECTS FOR CHILD 9

| PROJECT NAME | PROJECT NUMBER | AFP ID | HOURS YTD | FTE YTD | PROJECT OWNER | START DATE | END DATE | PROJECT ALTACCT |
|---|---|---|---|---|---|---|---|---|
| PROJECT Z | SKF31W01 | KF31 | 174.0 | 0.10 | WOO, T | JUN-01-1998 | JUN-21-1998 | BAWF24 |

756

BACK    FORT USER HOME

FIG. 16

SYSTEM AND METHOD FOR RESOURCE ALLOCATION AND PLANNING

FIELD OF THE INVENTION

The present invention generally relates to resource allocation and planning, and more particularly to tools for allocating resources amongst projects in a hierarchy of projects.

BACKGROUND OF THE INVENTION

The development of many large and mid-size products can be modeled using a hierarchical structure that is similar to an organization chart. At the top of the hierarchy is the development of a product. Product development requires the development of many sub-components or "deliverables." In turn, the successful development of each deliverable may require the support of one or more projects. For example, the development of large scale computing system requires hardware and software deliverables. The hardware deliverables may include major system components such as an instruction processor and a storage controller, and the software deliverables may include major system components such as an operating system adaptation and system control functionality. Each of these deliverables may in turn include one or more projects that are provided by one or more organizations of engineers. For example, the storage controller may include a main storage project and a second level cache project, and the operating system adaptation may include modifications to three software subsystems, each managed by a different project manager.

The hierarchical relationships between projects affects the manner in which negotiation for resources, i.e., personnel, is performed. During the planning stages of a project, the person who has authority over a group of people estimates the scope of work required, the time required to complete the work, and the number of people required to complete the project. These estimates are made by a project manager and are reported up a level in the management hierarchy as the project estimate. Oftentimes, the estimated, required number of people is less than the number of people that are actually funded by upper management. Thus, the various levels of management must negotiate funding levels and project content so that people resources can be allocated to achieve management objectives.

In an example prior system used by Unisys Corporation, resource allocation was reported using a tool called "RDP" (Research & Development Planning), which modeled all work using two levels: parents and children. RDP models products and deliverables as parents and children, respectively, without further levels in a project hierarchy. Thus, negotiating for resources and project content and seeing the implications of shifts in resource allocation on all projects in a project hierarchy was difficult.

A method and system that addresses the aforementioned problems, as well as other related problems, are therefore desirable.

SUMMARY OF THE INVENTION

A method and system for allocating resources amongst a hierarchy of projects are provided in various embodiments of the invention. In a first embodiment, a method is provided for management of resources estimated to be required to develop a product and distribution of resources allocated for the development of the product. A hierarchy of projects required for completion of the product is defined in a database, estimations of resource requirements are associated with the respective projects, and project-level target allocations of resources are associated with the respective projects. The project-level target allocations of resources are automatically summed for a calculated total target allocation of resources, and the calculated total target allocation of resources is associated with the product. An actual total target allocation of resources is assigned to the product, and the hierarchy of projects, associated estimations of resource requirements, project-level target allocations, the calculated total target allocation, and the actual target allocation of resources for the product are interactively displayed.

In another embodiment, a computing apparatus is provided for management of resources estimated to be required to develop a product and distribution of resources allocated for the development of the product. The apparatus comprises a resource management database; means for establishing in a resource management database a definition of a hierarchy of projects required for completion of the product; means for establishing in the resource management database estimations of resource requirements for the respective projects; means for establishing in the resource management database project-level target allocations of resources for the respective projects; means for establishing in the resource management database a calculated total of the project-level target allocations of resources for the product; means for establishing in the resource management database an actual total target allocation of resources for the product; and means for interactively displaying the hierarchy of projects, associated estimations of resource requirements, project-level target allocations, the calculated total target allocation, and the actual target allocation of resources for the product.

In another embodiment, a system is provided for management of resources estimated to be required to develop a product and distribution of resources allocated for the development of the product The system comprises a resource management database, a server computer system coupled to the resource management database, and a client computer system coupled to the server system. The server system is configured and arranged to host resource management software, wherein the resource management software is configured to cause the server system to create in the resource management database a hierarchy of projects required for completion of the product, associate with the respective projects estimations of resource requirements, associate with the respective projects project-level target allocations of resources, automatically sum the project-level target allocations for a calculated total target allocation of resources for the product, associate with the product an actual total target allocation of resources, and interactively display the hierarchy of projects, estimations of resource requirements, project-level target allocations, the calculated total target allocation, and actual target allocation. The client computer system is configured and arranged to host a client user-interface program, the user-interface program configured to provide user input to and receive user output from the resource management software.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which:

FIGS. 7A and 7B comprise example user interface screens for creating a project in a project hierarchy;

FIGS. 8 and 9 illustrate user interface screens and for creating a parent (product) and a child (deliverable), respectively;

FIG. 10 shows the introductory user interface screen for establishing and distributing a product's total resource allocation;

FIG. 11 shows an example parent-children target resource allocation screen;

FIG. 12 shows an example screen for allocation of a total target resource level between parents, children, and projects;

FIGS. 13A and 13B illustrate an example report that indicates for a parent having assigned thereto a child whose actual expenditure of resources exceeds the target allocation for that child;

FIG. 14 illustrates an example report that includes options for viewing resource expenditures for the organizations having personnel that are working on a child of a product/parent;

FIG. 15 shows detailed resource expenditure information for an organization for a child of a product/parent; and FIG. 16 illustrates and example user-interface screen that provides further detailed resource expenditure information for a project that is assigned to a child.

Figure 1:
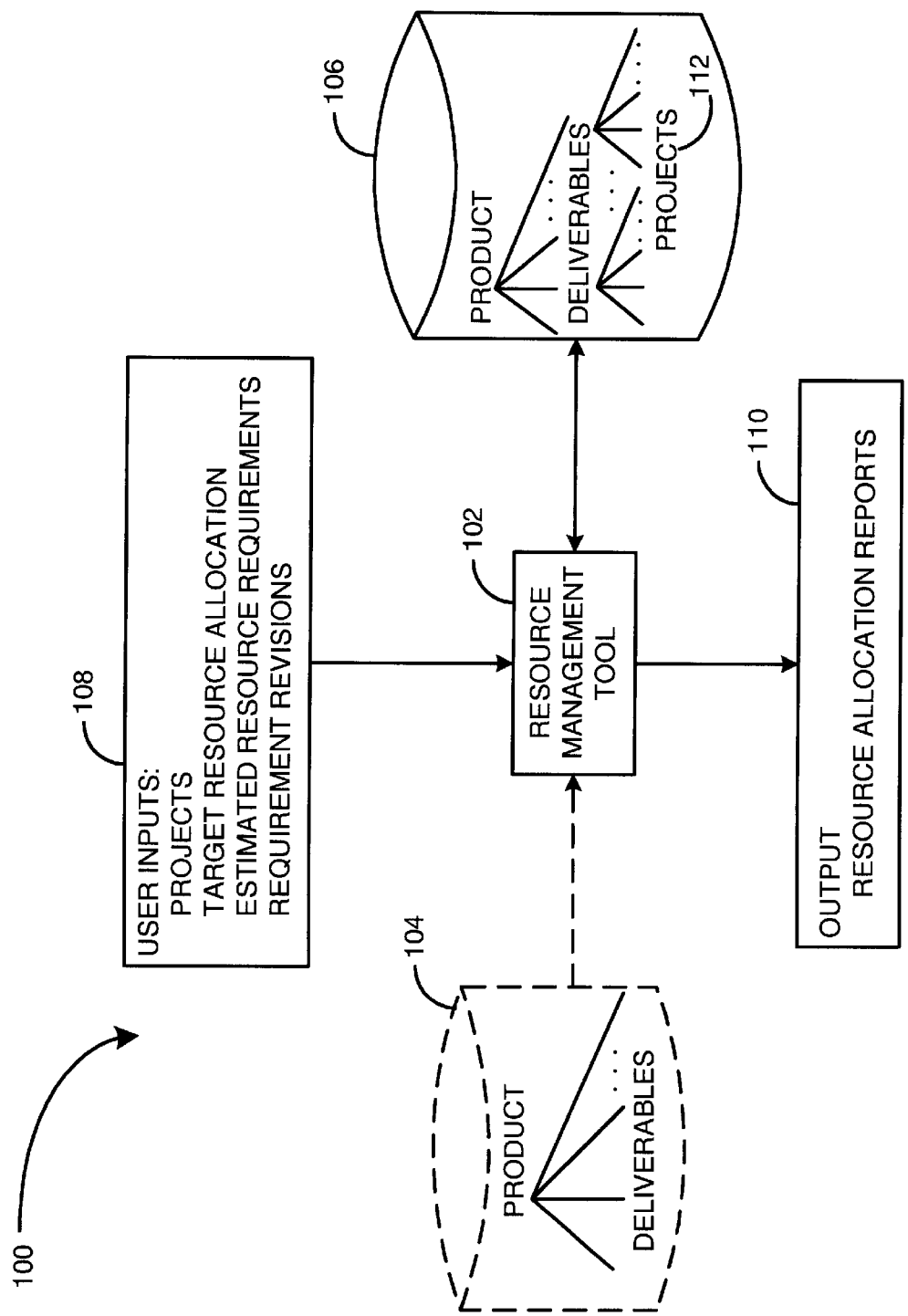
FIG. 1 is a functional block diagram of a system for allocating resources in accordance with an example embodiment of the invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

The present invention is believed to be applicable to a variety of systems and tools for managing resource allocation. The present invention has been found to be particularly applicable and beneficial in allocating resources amongst projects in a hierarchy of projects related to a product, for example. While the present invention is not so limited, an appreciation of the present invention is presented by way of a particular example application, in this instance, in the context of an example system for allocating personnel resources.

It should be understood that usage of the word "product" in this written description and in the claims is not intended to be construed as limiting the invention to any particular item that is conventionally viewed as a product that is made commercially available. Rather, "product" as used herein is intended to include things and services provided commercially, as well as things and services provided for internal use, by commercial, governmental, non-profit, and other types of enterprises.

FIG. 1 is a functional block diagram of a system for allocating resources in accordance with an example embodiment of the invention. The system 100 includes a resource management tool 102 that is coupled to a first database 104 and a second database 106. Generally, the resource management tool 102 receives user inputs, as indicated by block 108, which include project definitions and associations, target resource allocations, estimated resource requirements, and various revisions to the aforementioned attributes. These inputs are combined with pre-existing product and deliverable data found in database 104, such as the RDP database described above, to create a project hierarchy as depicted in database 106. Various user output screens and resource allocation reports are output as shown by block 110.

The input of project definitions to the resource management tool 102 includes a specification of the project hierarchy as shown in the database 106. The project hierarchy includes the relationship between the product, deliverables, and projects. In one embodiment, the specification of the product and its deliverables are specified in a first database 104, for example the RDP database described above. In another embodiment, the product, the deliverables required for completion of the product, and the projects which respectively comprise the deliverables are all input to the resource management tool 102.

While not shown, the project hierarchy could be extended to include additional project levels. For example, selected ones of the projects in the project layer 112 could be comprised of respective sets of sub-projects. It will also be appreciated that in some instances, deliverables will not have projects associated therewith. That is, the hierarchy may only be two levels deep for some deliverables that comprise the product. Where the hierarchy is only two-levels deep, it will be understood that the deliverables are comparable to projects shown in other parts of the hierarchy, and the discussion of functions and operations performed on projects which follows applies also to these deliverables.

Along with creating the project hierarchy, two types of resource attributes are established for the product, deliverables, and projects. At the top of the hierarchy, a "target" resource allocation is specified for the product, and at the bottom of the hierarchy "estimated" resource requirements are established for each of the respective projects. The target resource allocation is established by upper management and is a translation of money allotted to development of the product to a number of people-time units, for example. It will be appreciated that the "people-time units" can be person-years, where one person-year is one person working full-time for one year.

The "estimated" resource requirement for a project is the amount of resource estimated to be required to complete the project within a given period of time. The estimates are made by project managers, for example.

The resource management tool 102 receives the target resource allocation and divides the product target resource allocation between the deliverables and projects that comprise the product. This distribution of the product's target resource allocation is to all levels of the project hierarchy.

That is, the target resources are allocated to deliverables for which there are no projects defined and to projects that are in the project layer 112. It will be appreciated that the distribution could be extended to include sub-projects that comprise the various projects.

The distribution of the product's target allocation to the projects (and deliverables, if appropriate) is typically performed by the organization owner at each level. The target resource allocations specified for the projects are automatically totaled by the resource management tool 102 and associated with the product as the "calculated target headcount. The organization owner may choose to use the calculated value for a deliverable as the target resource allocation for the deliverable. The resource management tool 102 provides a mechanism for updating all deliverable target resource allocations with the sum of the project target resource allocations, as the first step in a resource planning sequence. Changes may be made independently to the deliverable target resource allocations, to reflect top-down changes that are required to be managed by the organization. The estimated resource requirements for the projects are automatically totaled by the resource management tool 102 and associated with the product as the total estimated resource requirement. The resource management tool 102 indicates when a project's estimated resource requirement differs from the project's target resource allocation, as well as any difference in the deliverable target resource allocation, the calculated target headcount (sum or project's target), and the total estimated resource requirement.

System 100 could be implemented in variety of computing arrangements. The system could be a single data processing system in which the resource management tool 102 is software that performs the functions described herein. The input and output blocks 108 and 110 may be implemented as the computer keyboard and display of personal computer or as a computer terminal.

Figure 2:
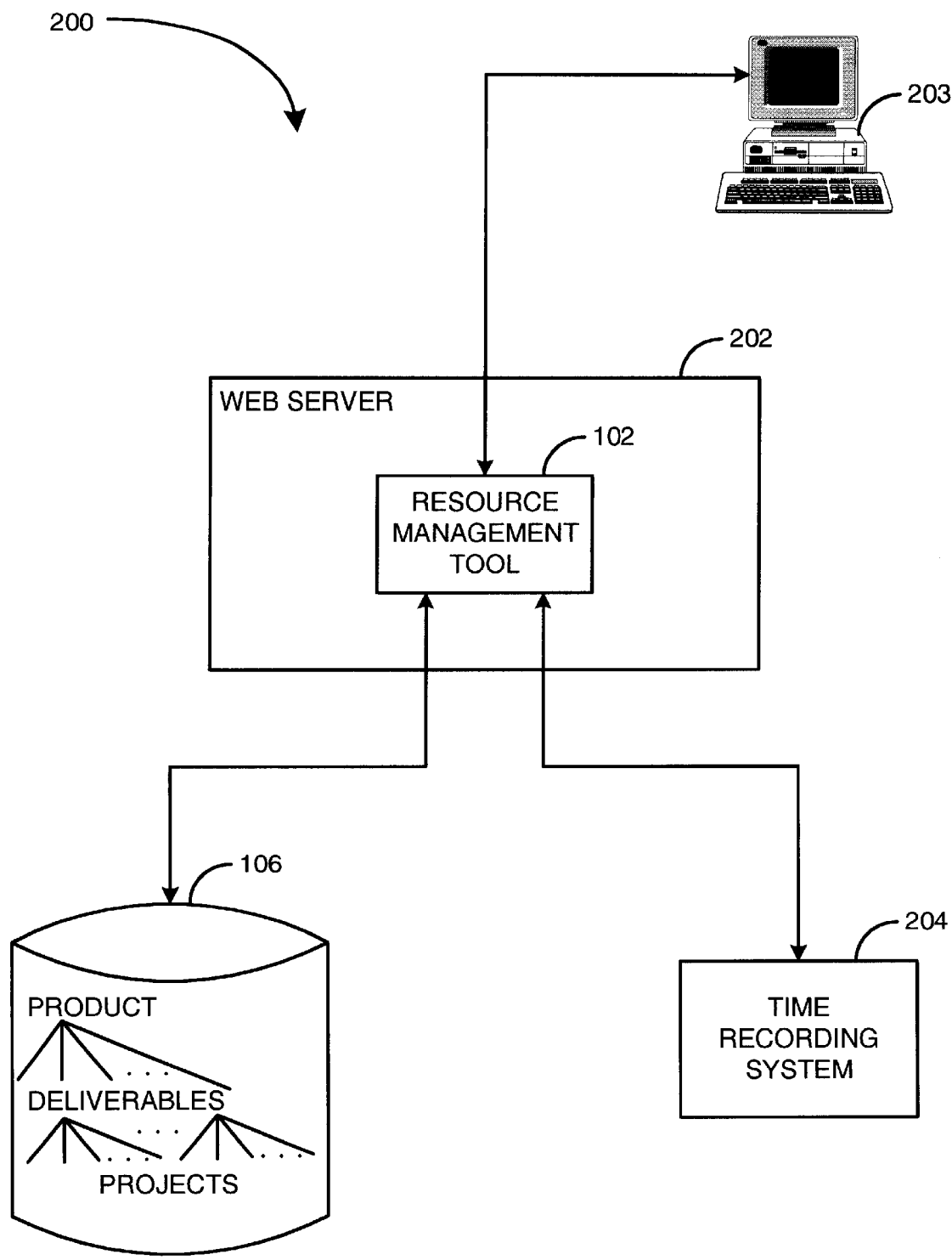
FIG. 2 is a functional block diagram of a computing arrangement that provides for resource management in accordance with an example embodiment of the invention.

FIG. 2 is a functional block diagram of a computing arrangement that provides for resource management in accordance with an example embodiment of the invention. The arrangement 200 generally depicts an internet based environment in which the resource management tool 102 is hosted by a computing system 202 that functions as a web server. A computer 203 that hosts a web browser, for example, Internet Explorer or Netscape Navigator, is coupled to the server system 202. The resource management tool 102 includes HTML forms and Javascript executables that provide the functions described herein, for example.

In an example embodiment, the database 106 is implemented using a Cold Fusion database engine, which is commercially available, for accessing an ODBC compliant database. Cold Fusion templates (not shown) are used to store database queries, processing logic, and HTML results processing.

A time recording system 204 is coupled to the resource management tool 102 in another embodiment. The time recording system 204 is a conventional software system in which data is maintained for time charged against projects by personnel working on the projects. Totals of time charged against the projects that comprise a product are provided by the time recording system 204 to the resource management tool 102. The resource management tool reports comparisons of the actual amounts of time charged against the projects' to the respective projects' allocations of the total target resource allocation. Thus, projects that are over budget and projects that are possibly behind schedule can be identified.

Figure 3A:
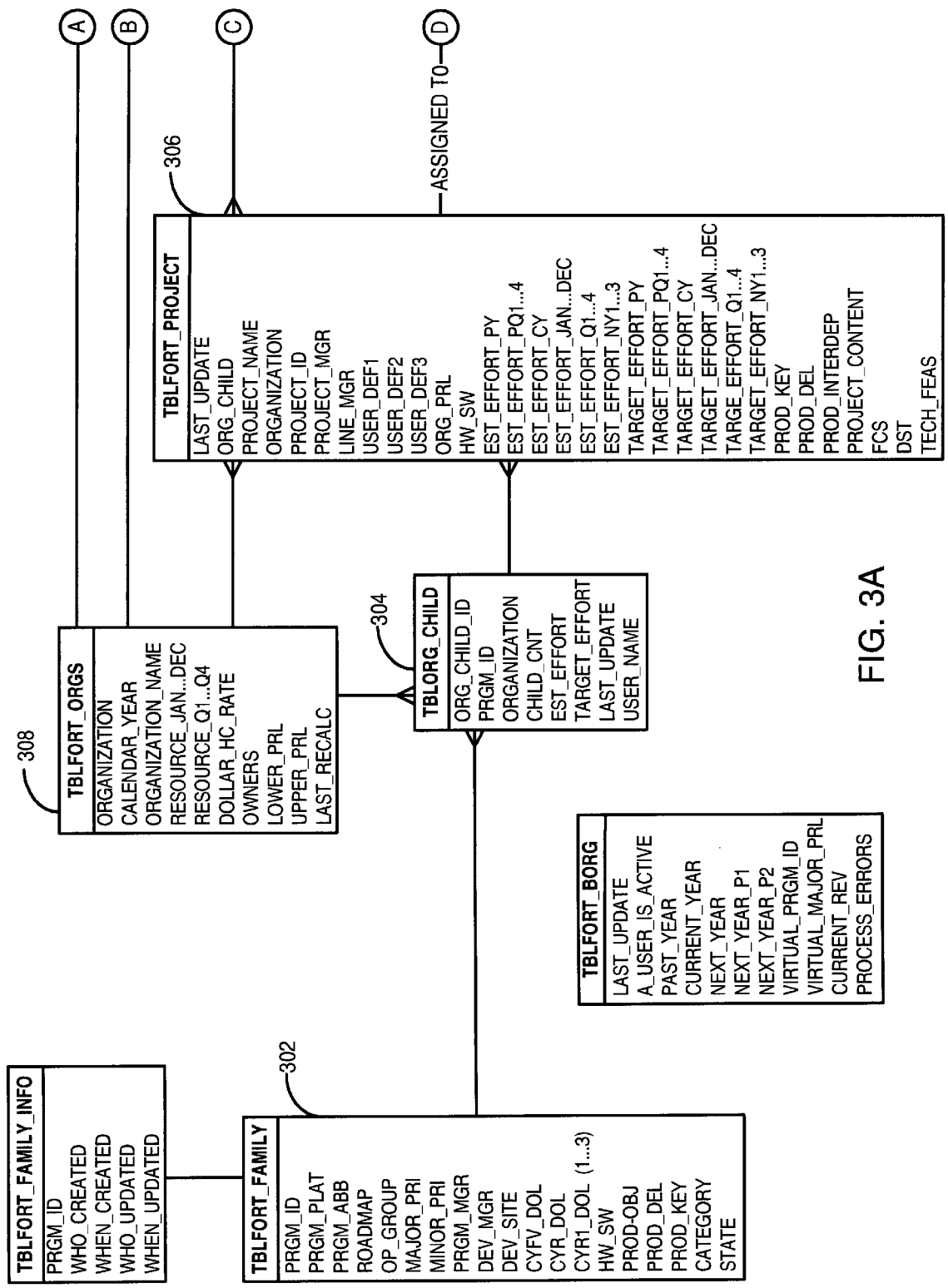
FIGS. 3A and 3B are block diagrams that illustrates the relationship between the data objects used to define the project hierarchy and provide the resource management functions.
Figure 3B:
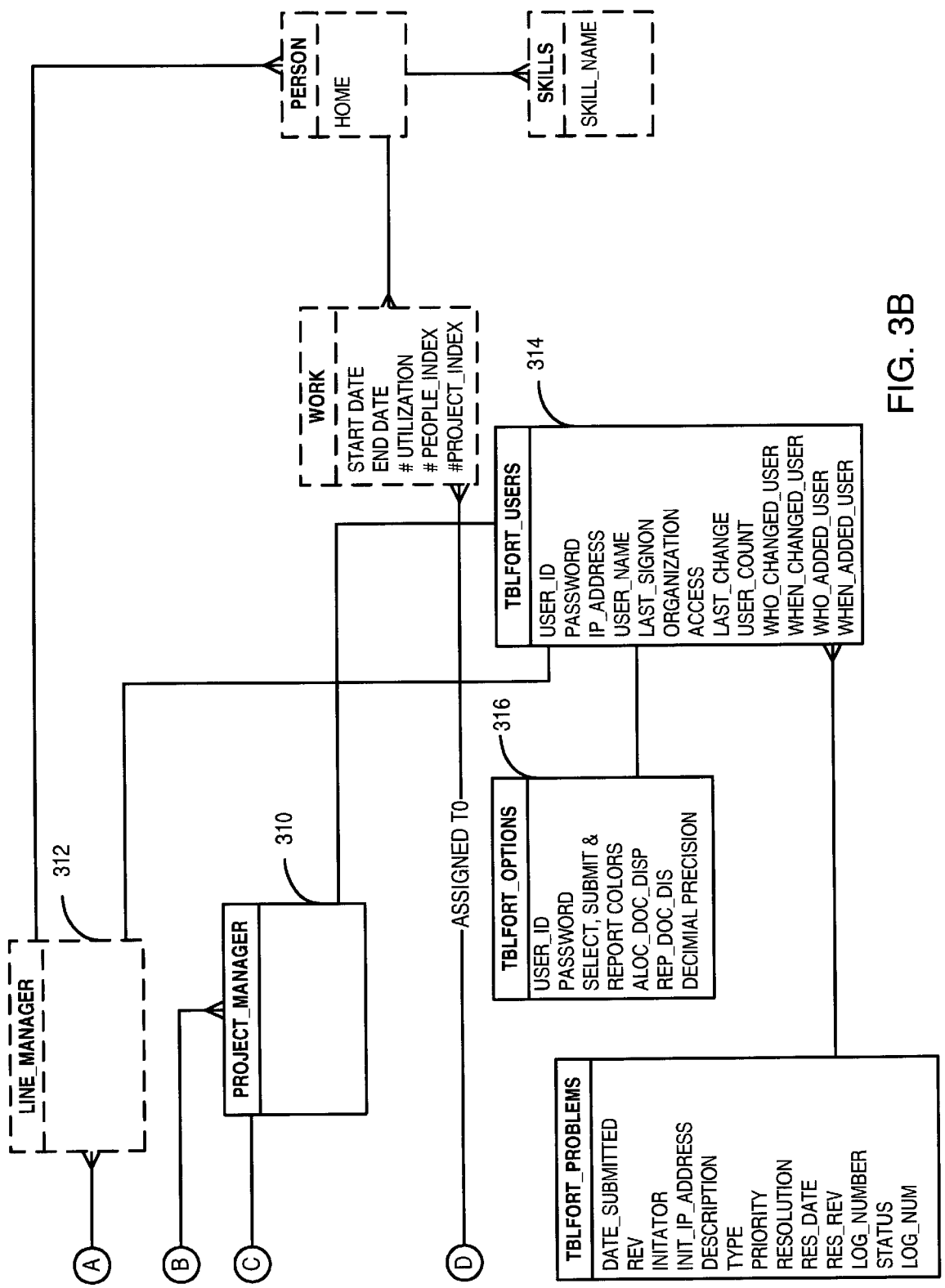

FIGS. 3A and 3B are block diagrams that illustrates the relationship between the data objects used to define the project hierarchy and provide the resource management functions, in accordance with an example embodiment of the invention. The resource management tool 102 is named "FORT" in an example implementation, and the names of the data objects in FIGS. 3A and 3B reflect this name. In addition, the example implementation uses the terms "parent" and "child" when referring to a product and deliverable, respectively. For convenience, these terms are adhered to elsewhere in this description.

Many of the attributes associated with the data objects depicted in FIGS. 3A and 3B are beyond the scope of the present invention. However, the objects and their attributes are shown in their entirety. The relevance of the various attributes will become apparent upon review of FIGS. 6A–15 and the accompanying discussion. In the discussion which follows, reference to a data object will be by the last portion of the name of the data object. For example, the "tblFORT_Family" data object 302 will be referenced as family object 302.

The family object 302 is used to define a product. It will be appreciated that structures parallel to that shown in FIGS. 3A and 3B could be defined for additional products. The family object 302 is linked to one or more instances of a child object 304, wherein the family object 302 represents the definition of a product as described above. The OrgChild object 304 represents the definition of a part of a deliverable as described above, where the part is to be completed by a single organization. One or more project objects 306 may be linked to the child object 304.

In yet another embodiment, one or more organization objects 308 can be defined and associated with one or more OrgChild objects 304, one or more project objects 306, one or more project manager objects 310, and one or more line manager objects 312. An organization is a group of personnel who share a common capability, some or all of whom are designated to work on a project or deliverable. A project manager is the person responsible for completion of a project, while a line manager is a person responsible for a group of personnel in an organization.

The users object 314 represents a user of the resource management tool 102, who may be a project manager or a line manager as indicated by links to blocks 310 and 312, respectively. The options object 316 includes various options associated with a user, such as a user password for security.

Figure 4:
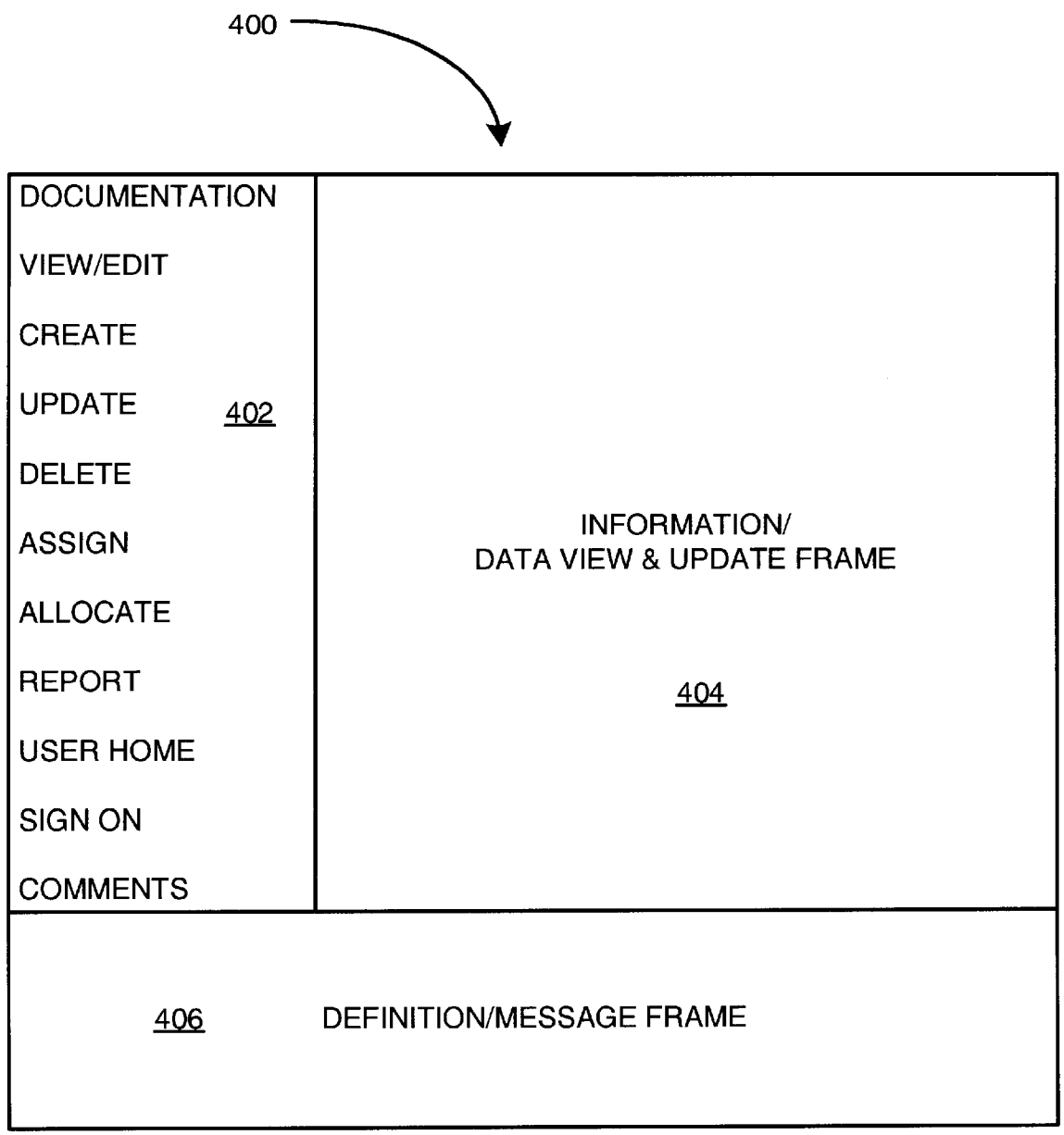
FIG. 4 shows an example display screen layout which is part of a user interface for the resource management tool.

Continuing now with FIG. 4, an example display screen layout 400 is shown which is part of a user interface for the resource management tool 102. The layout 400 is implemented with HTML in the example embodiment. The layout includes a navigation frame 402, an information/data view and update frame 404, and a definition/message frame 406. The functions available to a user of the resource management tool 102 are indicated in frame 402 and can be selected, for example, with a click of a mouse.

Frame 404 is the portion of the layout 400 in which output data from the resource management tool 102, such as reports, are displayed, and in which a user can enter data. The definition frame 406 provides assistance to the user in the form of definitions of terms and system messages.

The functions are described in the paragraphs that follow. The Documentation function displays a list of documentation.

The View/Edit function provides several views of the projects in an organization, and their associated parent or child. The following views are provided. The Project Manager View lists all projects "owned" by the specified individual. The project owner is generally the individual who is responsible for the project.

The Line Manager View, in contrast to the Project Owner's View, provides a list of all projects which are associated with a given Line Manager. Some organizations differentiate between a project manager (person who is responsible for the completion of the project) and a line manager (responsible for a functional group of employees, such as a Database group as opposed to a Compiler group).

An RDP-centric View by organization shows a report that is arranged according to the parents (products) within the RDP database that currently have projects assigned to them. The project priority for a given project is shown in parenthesis after the project. An "ADD PRJ" button next to each child is provided to allow authorized personnel to add a project under the child. A "VIEW" button is provided adjacent to each project, which is used to view a project report for that project.

The Development Manager View provides a report of all projects associated with the specified RDP child. This report includes projects in any organization, so that a person (Development Manager) who is responsible for a specific deliverable (RDP child), can see what organizations are contributing to the child (via projects), and specific information about each project.

The Unfiltered/All view shows all of the parents/children/projects within the RDP database, not just the parents for a specified organization. Projects can be added via the "ADD PRJ" button to any RDP parent or child.

The Create function allows the user to create a new project, parent, child, or organization. The Update function is used to update project or organization records. The Delete function allows the user to delete records associated with projects, parents, or children. Deletion of a parent of child only deletes a proposed parent or child which was created using the create function described above. Actual deletion of a parent or child is done using RDP, in an example embodiment.

The Assign function assigns a project to a parent or child. This process is the same as specifying a parent or child in the project create/update function, and links a project record to a parent or child record.

The Allocate function provides several features used to allocate actual headcount to various parents/children, and projects. The following allocation functions are provided: Allocate an organization's target headcount to all children/parents in the AFP spreadsheet; Allocate an organization's target headcount to only those assigned RDP children/parents; Allocate an organization's target headcount to children/parents AND PROJECTS assigned to those children/parents; and Allocate an organization's target headcount to projects according to the priority associated with the project.

The function, Allocate an organization's target headcount to all children/parents in the AFP spreadsheet, allows the review and update of a target value for any RDP parent or child in the RDP hierarchy, for a single organization. This is the effort planning data that is required by an umbrella organization from a group within the organization. The screen shows the current target values and provides an opportunity to change each parent/child value.

The function, Allocate an organization's target headcount to only those assigned RDP children/parents, performs allocation only for those children/parents that currently have projects assigned to them by the organization.

The function, Allocate an organization's target headcount to children/parents AND PROJECTS assigned to those children/parents, shows the yearly estimate (from the project manager) and yearly target for each project, the sum of the project estimates and target values for a child, and the sum of the children for a parent. The Parent, Child, and project target values can be modified on this screen, as well as the project priorities.

The function, Allocate an organization's target headcount to projects according to the priority associated with the project, provides a prioritized list of projects with their associated target and estimate data. The priority and target resource allocations can be modified for the selected projects.

The Report function provides several reports. The User Home function provides an interface for updating attributes associated with the current user, such as changing user options or changing a user password or user-id. The Sign On function provides an interface for logging into the system. The Comments function provides an interface for providing comments to the system designers.

Selected ones of the functions indicated in the navigation frame 402 are described below along with FIG. 5 and the example screens in FIGS. 6A–15.

Figure 5:
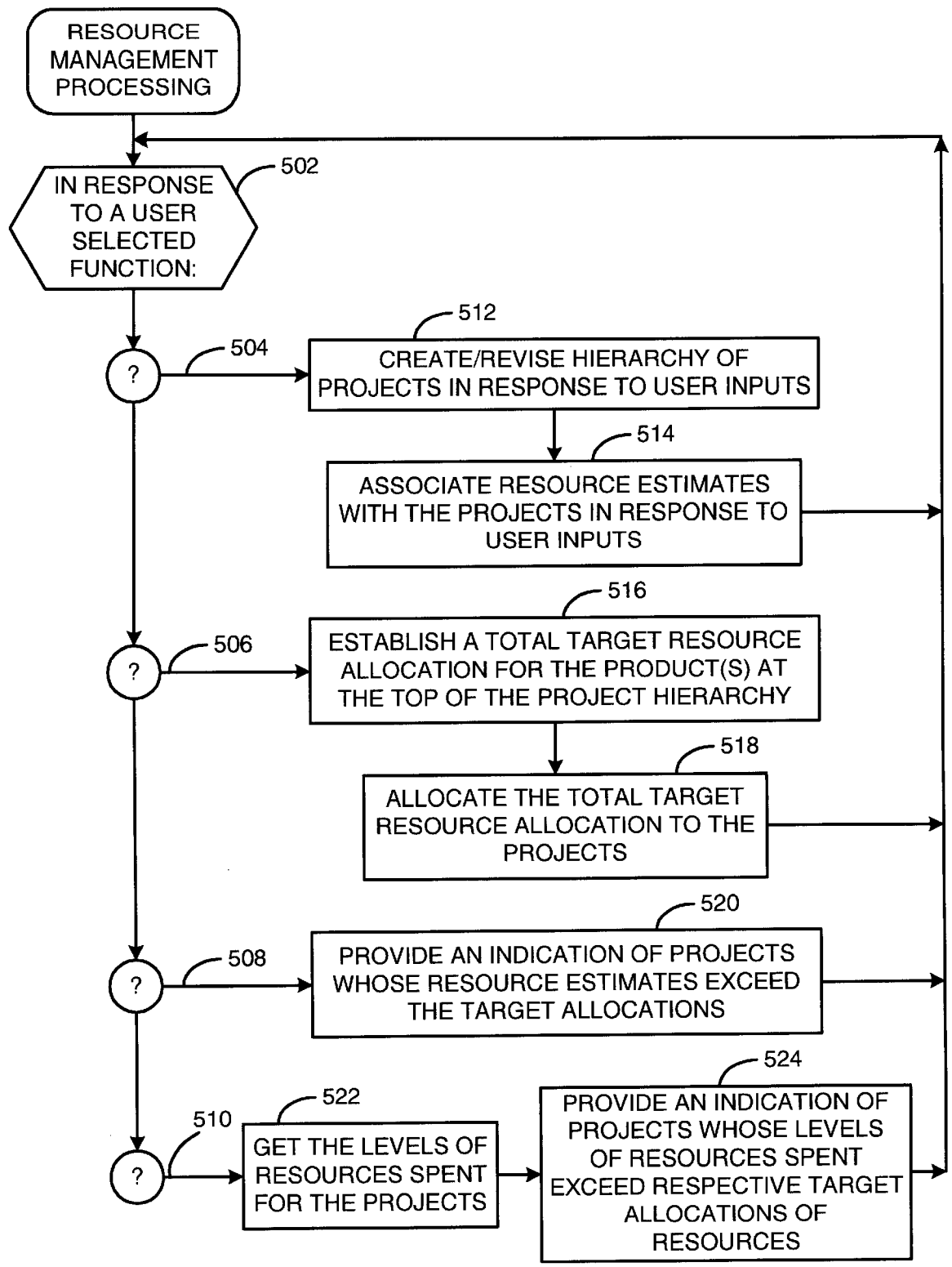
FIG. 5 is a flowchart of an example method for planning resource allocation amongst projects in a hierarchy of projects related to a product.

FIG. 5 is a flowchart of an example method for planning resource allocation amongst projects in a hierarchy of projects related to a product. The processing set forth in the flowchart is described below with references made to the display screens illustrated in FIGS. 6–16.

The resource management tool 102 generally follows the processing depicted in FIG. 5 relative to user selected functions. In response to a user selected function, decision block 502 directs processing along one of paths 504, 506, 508, or 510, where the "?" circles indicate testing for the selected function. While there is not a strict correlation between the processing depicted in FIG. 5 and the functions designated in FIG. 4, it will be understood upon review of FIGS. 6–16 which function or functions are used.

Figure 6:
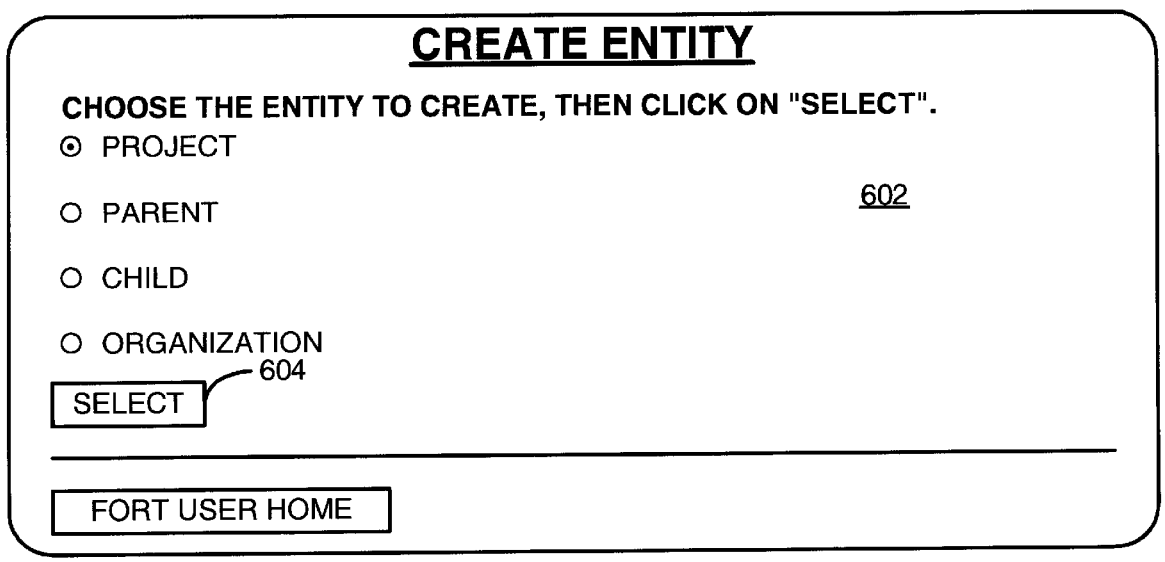
FIG. 6 illustrates an example create entity user interface screen.

The create function of FIG. 4 is used to initiate creation of a project, parent (product), child (deliverable), or organization. Corresponding to processing block 512 of FIG. 5, FIG. 6 illustrates an example create entity user interface screen 602. Once one of the entities is selected, the select button 604 is clicked-on.

FIG. 7A illustrates an example user interface screen 606 for creating a project in a project hierarchy. Note that the data entry fields on the display screen 606 correspond to the attributes shown in the project object 306 of FIG. 3. The child data entry block 608 is used for associating the project with one of the already defined children (deliverables).

A second portion of the create project user interface screen is shown in FIG. 7B. When a project object 306 is created, or later edited with the edit function, the estimated resource requirements for the project can be specified. In one embodiment, the resource requirements can be estimated and specified for the entire year 1998, as shown by block 612. The estimated requirements may also be specified by quarter for the year 1998, as shown by blocks 614, 616, 618, and 620. The estimated requirements can also be specified by month, and by years, as shown by the row 622 of blocks and the row 624 of blocks, respectively. The association of the resource estimates with the project is shown as process block 514 in FIG. 5.

In creating a project, the user provides a project name, project manager & line manager names, and an organizational priority. The project can be assigned to an RDP Parent or Child at this time, or left unassigned. Several text fields may be entered, including project objectives, key deliverables, description, and interdependencies. The text fields serve as a mechanism to determine the scope of the project. Three user-defined fields allow for the arbitrary selection of projects using keywords, and three date fields are provided to allow the specification of the Feasibility, Delivery to System Test (DST), and First Customer Shipment (FCS) for the project. Finally, the resource data can be entered using the Target and Estimate fields, for the years shown on the entry screen. The data may be entered in months, quarters or years, and appropriate entries are created based on what the user entered (i.e., quarter and year data if months were entered, or month data if quarters were entered, etc.). The estimate data is specified by the project manager, and indicates the best estimate of resource needs to complete the project on schedule. The target data is specified by the organization owner, and indicates the current plan for this project. Discrepancies are identified on the Allocation screens.

The create child and create parent functions are used to create parents & children that require resources, but are not managed in RDP (such as Overhead), or to make proposed development Parents & Children that will eventually be entered in RDP.

The create organization is used to add an organization name, number, and owner to the list of allowed organizations.

It will be appreciated that a similar data entry screen which is similar to user interface screen 606 can be used for the view and edit functions.

FIGS. 8 and 9 illustrate user interface screens 626 and 628 for creating a parent (product) and a child (deliverable), respectively. Creation of the parent (product), children (deliverables), and projects, along with the necessary assignments, generally completes the process of creating the project hierarchy.

The allocate function shown in FIG. 4 is selected to establish the total resource allocation for a product, as shown by process block 516 of FIG. 5. FIG. 10 shows the introductory user interface screen 632 for establishing and distributing a product's total resource allocation. Various embodiments are shown as the different selectable options 634, 636, 638, and 640, and described in the associated option descriptions.

Selection of option 634 causes display of the user interface screen 652 as shown FIG. 11. The parent-children allocation of screen 652 supports specification of a target resource allocation for a product and then division of the target allocation only amongst the children (deliverables) that comprise the product. The viewing of the division of the target allocation amongst the projects that comprise the children is not provided in screen 652.

Products designated as parent 1, parent 2, through parent R are defined for the example organization 4120. Parent 1 has deliverables 1–M, and parents 2 and R have assigned the specified children. Data entry blocks are provided in the top-down target head count column 654. When a target resource allocation level is entered in a block associated with a parent, for example parent R, a discrepancy between the parent target value and any of the other calculated values shown is flagged in discrepancy column 656. A target resource allocation can also be entered for a child, which is then used in the calculation of the child target roll-up value for the parent, and also to compare against the two calculated values for the child. In this manner, discrepancies between project target allocations and estimated requirements sums, child target allocation values, parent target allocation values, and the sum of the child target allocation values, are all used to identify the level at which the target and estimate values do not match.

The allocate screen 652 illustrates one embodiment for indicating when the estimated resource requirements exceed the target allocation. In particular, the discrepancy column 656 includes a strings of asterisks beside parents (products) and children (deliverables) whose estimated resource requirements exceed the target allocations. Once a discrepancy is identified, an organization owner and appropriate project managers typically change resources, schedule, or project scope as part of the negotiation process.

Note that column 658 displays the specified estimated resource requirements for the parents and children, as calculated from the project estimations specified in the create project screen 606 of FIGS. 7A and 7B.

Selection of option 638 causes display of the user interface screen 662 as shown in FIG. 12. The parent-children allocation of screen 662 supports specification of a target resource allocation for a product and then division of the target allocation amongst the children (deliverables) and projects that comprise the product.

The product designated as parent R is shown along with its assigned children N and N+1 and their respectively assigned projects. Data entry blocks are provided in the top-down target head count column 664. A target resource allocation level may be entered in a block associated with a parent, for example parent R. A target resource allocation may also be entered in a block associated with a child, for example Child N. The sum of the child target resource allocations is displayed to the right of the box for the parent, and is used in determining whether a discrepancy exists for the parent. A target resource allocation for a project may also be entered in a block, which is used to update the project database. The sum of these project target values is shown at the child level in the calculated target headcount 666 column. As compared to the allocation screen 652, screen 662 also shows the distribution of the target resource between the projects, as shown by column 666. The discrepancy column 668 is similar to the discrepancy column 656 of screen 652.

In an example scenario for using the resource management tool 102, project level managers initially enter both estimated resource requirements and target resource allocations for their respective projects. The target resource allocations set by the managers are initially the same as the estimated resource requirements because the project level managers typically will not know what level of resource will be provided by upper management. Thus, initially in an example resource allocation scenario, the values in columns 666 and 667 may be equal.

The target resource allocation levels for the projects are summed and the total for the child is displayed in column 666 at the row for the child, for example 33.8 for child N. Similarly, the target resource allocation levels for the children, for example children N and N+1 are summed and displayed in column 664 at the row for the parent R.

In the next phase of resource management, for example, managers above the project level begin the process of specifying actual target resource allocation levels for the parent, children, and then the projects. For example, where the initial top-down target head count may have been 51.0 (being the sum of initial target value entries made by the project managers), the product manager may set the target resource allocation level for the product, "parent R," at 39.3.

Then the product manager and the manager(s) of the children N and N+1 must decide how that target resource allocation will be divided between the children. This process continues down to the project level, with the resource management tool 102 serving as a repository for the target resource allocation levels and for the estimated resource requirements. The tool also flags discrepancies between target resource allocation levels and estimated resource requirements. In addition, the tool flaps discrepancies between a total target resource allocation (being the sum of the target levels below in the hierarchy) and a corresponding specified target resource allocation level (for example, if the specified value in block 669 was less than the total value from calculated total target headcount value 670).

Review, update, and calculation of project level target resource allocations can also be performed for projects having a specified priority level. The priority selector fields 642 and 644 of FIG. 10 are used to specify the selected priority range in combination with the selection of options 634, 636, 638, and 640.

FIGS. 10, 11, and 12 have been provided to illustrate an example embodiment associated with processing blocks 516 and 518. It will be appreciated that the same screens 652 and 662 also illustrate the manner in which an indication is provided where the estimated resource requirements exceed the target allocation of resources, as specified in processing block 520 of FIG. 5.

Continuing now with processing blocks 522 and 524 of FIG. 5, the resource management tool 102 provides a mechanism to determine whether particular projects are over-budget or possibly behind schedule. At block 522, the resource management tool 102 obtains time records from the time recording system 204. The time records include person-hours worked per project. The person-hours are then annualized on a project-by-project basis. The information from the time records system represents the actual expenditure of resources on the projects.

An indication of the projects whose actual expenditure of resources exceeds the target allocation of resources is generated at block 524. In an example embodiment, the user interface screen 702 of FIGS. 13A and 13B is a report that provides this indication for a parent designated as product X having assigned thereto a child 1 whose actual expenditure of resources exceeds the target allocation for that child. In column 704 it can be seen that 2051.3 person-hours have been spent for the year-to-date working on child 1. The yearly equivalent is 1.1 person-years as indicated in column 706.

The values in the AFP budget column are taken from a document, for example a spreadsheet, that specifies the yearly resources to be applied to each parent and child. As part of the planning process, this spreadsheet can be directly created from the resource management tool 102. The values in the FORT YTD plan column 710 are person-year values based on the target allocation of resources to the assigned projects (see the allocation screens 652 and 662 in FIGS. 11 and 12. As indicated in the descriptions at the top of the screen 702, the information in the budget on track column 712 is based on a comparison of the actual YTD information of column 706 to the information of the AFP budget column 708. The information in the plan on track column 714 is based on a comparison of the information in the actual YTD column 706 with the information in the FORT YTD plan column 710.

The information in the run rate YTD column 716 indicates a projected expenditure of resources for an entire year assuming that the present rate of resource consumption, as indicated by the actual YTD column 704, continues. The information in the run rate EOY column 718 indicates a level of resource expenditure from the reporting date until the end of the year that is necessary to achieve an actual YTD expenditure of resources (column 706).

The user interface screen 732 in FIG. 14 shows essentially the same information as screen 702, but also includes options for viewing resource expenditures for the organizations having personnel that are working on child 9 of product X. Screen 742 in FIG. 15 shows detailed resource expenditure information for organization 4140 for child 9 of product X.

Interface screen 752 in FIG. 16 provides further detailed resource expenditure information for the project Z that is assigned to child 9 for organization 4140. In the example screen, both a resource management tool (FORT) entry 754 and a time recording system (TRS) entry 756 are provided. Selection of the view button 758 for the project causes display of the data associated with the project, in particular, the data shown in user-interface screen 606 of FIGS. 7A and 7B.

Accordingly, the present invention provides, among other aspects, a method and system for resource allocation and planning. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims

We claim:

1. A computer implemented method for management of resources estimated to be required to develop a product and distribution of resources allocated for the development of the product, comprising:

interactively defining a hierarchy of projects required for completion of the product;

interactively associating estimates of resource requirements with the respective projects;

interactively associating project-level target allocations of resources with the respective projects;

automatically summing the estimates of resource requirements and project-level target allocations of resources for a total estimated resource requirement and a calculated total target allocation, respectively, and associating the total estimated resource requirement and calculated total target allocation of resources with the product;

interactively assigning an actual total target allocation of resources to the product; and interactively displaying the hierarchy of projects, associated estimates of resource requirements, project-level target allocations, total estimated resource requirement, calculated total target allocation, and the actual target allocation of resources for the product.

2. The method of claim 1, further comprising interactively indicating when the project-level target allocations are not equal to the estimates of resource requirements for the respective projects.

3. The method of claim 2, further comprising interactively indicating when the calculated total target allocation is not equal to the total of the estimates of resource requirements.

4. The method of claim 3, further comprising:

interactively associating revised estimates of resource requirements with the respective projects responsive to user input data; and automatically establishing for the product a revised total of the estimates of resource requirements responsive to the revised estimates.

5. The method of claim 4, further comprising:
interactively associating revised project-level target resource allocations with selected ones of the respective projects responsive to user input data; and
automatically revising the calculated total target allocation of resources for the product.

6. The method of claim 1, wherein the resource requirements are designated in persons per year.

7. The method of claim 1, wherein the resource requirements are designated in persons required per quarter-year.

8. The method of claim 1, wherein the resource requirements are designated in persons required per month.

9. The method of claim 1, further comprising:
selecting a subset of the projects; and
interactively displaying the hierarchy of projects, associated estimates of resource requirements, project-level target allocation, total estimated resource requirement, calculated total target allocation, and the actual target allocation of resources for the subset of the projects.

10. The method of claim 9, further comprising associating characteristics with the projects, wherein the subset of projects selected share at least one selected characteristic.

11. The method of claim 10, wherein the characteristics include a priority level.

12. The method of claim 1, further comprising:
recording levels of resources spent on the respective projects; and
interactively providing an indication of projects whose levels of resources spent exceed the respective project-level target allocations of resources.

13. A computer implemented method for management of resources estimated to be required to develop a product and distribution of resources allocated for the development of the product, comprising:
interactively defining deliverables required for completion of the product;
interactively defining projects required for completion of the respective deliverables;
interactively associating estimates of resource requirements with the respective projects;
interactively associating project-level target allocations of resources with the respective projects;
automatically summing the estimates of resource requirements and project-level target allocations of resources for a total estimated resource requirement and a calculated total target allocation of resources, respectively, and associating the total estimated resource requirement and the calculated total target allocation of resources with the product;
interactively assigning an actual total target allocation of resources to the product; and
interactively displaying the hierarchy of projects, associated estimates of resource requirements, project-level target allocations, total estimated resource requirement, calculated total target allocation, and the actual target allocation of resources for the product.

14. A computing apparatus for management of resources estimated to be required to develop a product and distribution of resources allocated for the development of the product, comprising:
a resource management database;
means for establishing in a resource management database a definition of a hierarchy of projects required for completion of the product;
means for establishing in the resource management database estimates of resource requirements for the respective projects;
means for establishing in the resource management database project-level target allocations of resources for the respective projects;
means for establishing in the resource management database a calculated total of the project-level target allocations of resources for the product;
means for establishing in the resource management database a total estimated resource requirement for the product;
means for establishing in the resource management database an actual total target allocation of resources for the product; and
means for interactively displaying the hierarchy of projects, associated estimates of resource requirements, project-level target allocations, total estimated resource requirement, calculated total target allocation, and the actual target allocation of resources for the product.

15. A system for management of resources estimated to be required to develop a product and distribution of resources allocated for the development of the product, comprising:
a resource management database;
a server computer system coupled to the resource management database and configured and arranged to host resource management software, wherein the resource management software is configured to cause the server system to create in the resource management database a hierarchy of projects required for completion of the product, associate with the respective projects estimates of resource requirements, associate with the respective projects project-level target allocations of resources, automatically sum the estimates of resource requirements and project-level target allocations for a total estimated resource requirement and a calculated total target allocation of resources for the product, respectively, associate with the product an actual total target allocation of resources, and interactively display the hierarchy of projects, estimates of resource requirements, project-level target allocations, total estimated resource requirement, calculated total target allocation, and actual target allocation;
a client computer system coupled to the server computer system and configured and arranged to host a client user-interface program, the user-interface program configured to provide user input to and receive user output from the resource management software.

16. The system of claim 15, wherein the resource management software is further configured to cause the server system to indicate when the project-level target allocations are not equal to the estimates of resource requirements for the respective projects.

17. The system of claim 15, further comprising:
a time recording computing arrangement coupled to the server system, configured and arranged to provide data indicating actual resource expenditures for the projects; and
wherein the resource management software is further configured to cause the server system to compare the actual resource expenditures to the actual total target allocation of resources and indicate when the actual resource expenditures is greater than the actual total target allocation of resources.

18. The system of claim 17, wherein the resource requirements are designated in persons per year.

19. A computer implemented method for management of resources estimated to be required to develop a product and distribution of resources allocated for the development of the product, comprising:

- interactively defining a hierarchy of projects required for completion of the product;
- interactively associating estimates of resource requirements with the respective projects;
- interactively associating project-level target allocations of resources with the respective projects;
- automatically combining the estimates of resource requirements and project-level target allocations of resources for a total estimated resource requirement and a calculated total target allocation, respectively, and associating the total estimated resource requirement and calculated total target allocation of resources with the product;
- interactively assigning an actual total target allocation of resources to the product; and
- interactively displaying the hierarchy of projects, associated estimates of resource requirements, project-level target allocations, total estimated resource requirement, calculated total target allocation, and the actual target allocation of resources for the product.

* * * * *